US010199846B2

United States Patent
Lueth

(10) Patent No.: US 10,199,846 B2
(45) Date of Patent: Feb. 5, 2019

(54) ELECTRIC POWER CONVERSION DEVICE AND METHOD FOR CHARGING AND DISCHARGING ENERGY STORAGE DEVICES

(71) Applicant: TRUMPF Huettinger GmbH + Co. KG, Freiburg (DE)

(72) Inventor: Thomas Lueth, Freiburg (DE)

(73) Assignee: TRUMPF Huettinger GmbH + Co. KG, Freiburg (DE)

( * ) Notice: Subject to any disclaimer, the term of this patent is extended or adjusted under 35 U.S.C. 154(b) by 246 days.

(21) Appl. No.: 15/221,849

(22) Filed: Jul. 28, 2016

(65) Prior Publication Data

US 2016/0336780 A1    Nov. 17, 2016

Related U.S. Application Data

(63) Continuation of application No. PCT/EP2015/051586, filed on Jan. 27, 2015.

(30) Foreign Application Priority Data

Jan. 28, 2014    (DE) .................. 10 2014 100 989

(51) Int. Cl.
*H01M 10/44* (2006.01)
*H01M 10/46* (2006.01)
(Continued)

(52) U.S. Cl.
CPC ....... *H02J 7/0052* (2013.01); *H01M 8/04186* (2013.01); *H01M 8/188* (2013.01);
(Continued)

(58) Field of Classification Search
CPC ........ H02J 7/0021; H02J 7/0026; H02J 7/007; H02J 7/009; H02J 7/0091
(Continued)

(56) References Cited

U.S. PATENT DOCUMENTS

| 2005/0156431 | A1 | 7/2005 | Hennessy |
| 2012/0203392 | A1 | 8/2012 | Pandy et al. |
| 2016/0322845 | A1* | 11/2016 | Lueth .................. H02J 3/32 |

FOREIGN PATENT DOCUMENTS

| DE | 102010027854 A1 | 10/2011 |
| DE | 102011106944 A1 | 1/2013 |

OTHER PUBLICATIONS

International Search Report for corresponding PCT Application No. PCT/EP2015/051586, dated Mar. 24, 2015, 4 pages.

* cited by examiner

*Primary Examiner* — Edward Tso
(74) *Attorney, Agent, or Firm* — Fish & Richardson P.C.

(57) ABSTRACT

An electric power conversion device for charging and discharging energy storage devices having at least one bidirectional voltage converter which can be connected to a power supply network and to at least one electrochemical energy converter for an energy storage device that is configured as a flow battery and has a circulation arrangement for electrolytes. The electric power conversion device has a controller connected to the voltage converter and is designed to control the voltage converter with regard to the power flow direction thereof. The controller is designed to control one or more energy storage peripheral devices associated with the electrolytes depending on the power flow direction of the voltage converter specified by the controller. The controller has at least one control port for connection of at least one of these energy storage peripheral devices.

20 Claims, 3 Drawing Sheets

(51) Int. Cl.
*H02J 7/00* (2006.01)
*H01M 8/18* (2006.01)
*H02J 3/32* (2006.01)
*H02J 7/34* (2006.01)
*H01M 8/04186* (2016.01)
*H02M 3/24* (2006.01)

(52) U.S. Cl.
CPC ............... *H02J 3/32* (2013.01); *H02J 7/007* (2013.01); *H02J 7/0068* (2013.01); *H02J 7/34* (2013.01); *H02M 3/24* (2013.01); *H02J 2007/0059* (2013.01); *Y02E 60/528* (2013.01)

(58) Field of Classification Search
USPC ........ 320/104, 107, 127, 132, 135, 143, 150
See application file for complete search history.

ELECTRIC POWER CONVERSION DEVICE AND METHOD FOR CHARGING AND DISCHARGING ENERGY STORAGE DEVICES

CROSS-REFERENCE TO RELATED APPLICATIONS

This application is a continuation of and claims priority under 35 U.S.C. § 120 to PCT Application No. PCT/EP2015/051586 filed on Jan. 27, 2015, which claims priority to German Application No. DE 10 2014 100 989.4, filed on Jan. 28, 2014. The contents of both of these priority applications are hereby incorporated by reference in their entireties.

TECHNICAL FIELD

The invention relates to current converter devices and methods for charging and discharging energy stores.

BACKGROUND

Alternative energies are becoming ever more important. The problem with alternative energies, e.g., solar or wind power, is that it is not possible to manipulate the times during which energy is generated and surplus energy has to be temporarily stored in order to be available at times when no energy can be generated. It is therefore necessary to use energy storage systems. However, energy storage systems are subject to losses, which should be avoided.

A suitable energy store is a flow battery or an electrochemical energy converter for a flow battery, in particular a redox flow battery, comprising a circulation arrangement for electrolytes, electrolyte lines for supplying and conducting away one or more electrolytes from a supply tank to the electrochemical energy converter and back to the same supply tank in the form of a loop process, the electrochemical energy converter comprising at least one reaction cell having two electrodes and an ion-conducting membrane, preferably a plurality of electrically interconnected individual cells, said cells preferably being supplied with electrolytes in a parallel circuit and each comprising an inlet region for introducing the electrolytes into the reaction cell and an outlet region for conducting the electrolytes out of the reaction cell. To be able to convert electrical energy into an electrochemical energy store of this kind in a particularly efficient manner, it is necessary to control energy store peripherals, e.g., circulation pumps. The current converter device also has to control the power flow direction.

Conventional energy storage systems comprise a control unit for the energy store peripherals, which attempts to detect the current charge state of the energy store on the basis of various parameters, e.g., current, voltage, flow rate, temperature, pressure of the electrolytes, in order to thus control the energy store peripherals such as the circulation pumps.

Conventional current converter devices operate independently of said control unit and use a voltage converter to convert the voltage from the power grid into a voltage for the energy store in the charging mode and vice versa in the discharging mode. In the process, the current converter device controls the power flow direction of the electrical power in the voltage converter.

Losses often arise because there is insufficient interaction between the control unit controlling the energy store peripherals and the current converter device controlling the power flow direction control.

SUMMARY

One aspect of the invention features a current converter device for charging and discharging energy stores. The current converter device comprises at least one bidirectional voltage converter that can be connected to a power grid and to at least one electrochemical energy converter for an energy store formed as a flow battery, in particular as a redox flow battery, and having a circulation arrangement for electrolytes. The current converter device additionally comprises a controller that is connected to the voltage converter and is designed to control the power flow direction of the voltage converter. Furthermore, the controller is designed to control one or more of the following energy store peripherals on the basis of the power flow direction of the voltage converter specified by the controller:
  pumps for circulating the electrolyte,
  flow regulators for regulating the electrolyte flow volume,
  temperature controller for adjusting the electrolyte temperature,
  pressure controller for adjusting the electrolyte pressure.

The controller comprises at least one control connection for connecting at least one of said energy store peripherals.

As a result, the current converter device can in fact significantly increase its own efficiency since the controller can control the power flow direction of the voltage converter so precisely over time that the power converted by the voltage converter can be tapped or provided by the energy converter to a significantly better extent. Very rapid current or voltage peaks in the power grid can thus be absorbed very effectively.

The controller can be designed to additionally control the voltage converter on the basis of the amount of power. The efficiency of the voltage converter can be increased further as a result.

The controller can be designed to additionally control the voltage converter on the basis of the amount of energy. The efficiency of the voltage converter can be increased further as a result.

The controller can be designed to additionally control the control connection for at least one energy store peripheral on the basis of the amount of power. The efficiency of the voltage converter can be increased further as a result.

The controller can be designed to additionally control the control connection for at least one energy store peripheral on the basis of the amount of energy. The efficiency of the voltage converter can be increased further as a result.

The controller can have a signal input for detecting one or more of the following process parameters:
  temperature of the electrolyte,
  pressure of the electrolyte,
  flow volume of the electrolyte,
  fill level of the electrolyte in a supply tank.

The controller can thus receive information about the state of the energy storage system. As a result, the efficiency of the voltage converter can be increased further because the controller can recognize even more quickly how it has to control the power flow direction, the amount of power and/or the amount of energy. Furthermore, it can control the at least one energy store peripheral in an even more reliable and efficient manner. In addition, it is also possible to automatically control the at least one energy store peripheral, e.g., a temperature control device for the electrolyte. Other process parameters that can be detected by the signal input may include: temperature monitoring of the surrounding area, monitoring of environmental influences in the surrounding area, such as air pressure, moisture or a leak in the acid tank.

The controller can comprise a connection for graphically displaying the process parameters, the power flow direction, the power flow rate and/or the amount of energy. The energy storage system can thus be monitored more effectively. Error states can be recognized more easily and it may be possible to deal with errors sooner, which also helps to improve efficiency since every interruption causes the energy balance to deteriorate. In addition, a device of this type makes the supply more reliable. Some power consumers can, however, also be deliberately switched on or off depending of the charge state of the energy stores, e.g., electrically powered vehicles, which may have very high energy requirements but often do not have to be immediately charged.

The controller can comprise a data memory for storing the power flow direction, the power flow rate and/or the amount of energy. The energy storage system can thus be monitored more effectively and constantly improved.

The control connection and/or the signal input and/or the connection for the graphic display can be designed as digital connections or inputs. Digital connections are more reliable in areas where the energy storage system is subject to high electromagnetic noise fields.

The controller can comprise an interface for communicating data to a data communications network, e.g. to the internet or mobile communications networks (GSM, UMTS, LTE). In this case, the controller can, for example, communicate alert signals.

The controller can be designed to actuate at least one energy store peripheral via the control connection on the basis of a power flow direction specified by the controller at the same time as the controller controls the power flow direction of the voltage converter by means of said specified power flow direction. The efficiency of the current converter device can be increased further as a result.

The controller can be designed to actuate at least one energy store peripheral via the control connection on the basis of a power flow direction specified by the controller before the controller controls the power flow direction of the voltage converter by means of said specified power flow direction. The efficiency of the current converter device can be increased further as a result.

Another aspect of the invention features an energy storage system comprising a current converter device as described above. The energy storage system can also comprise a flow battery, in particular a redox flow battery, having a circulation arrangement for electrolytes. The following can also be provided: electrolyte lines for supplying and conducting away one or more electrolytes from a supply tank to the electrochemical energy converter and back to the same supply tank in the form of a loop process, the electrochemical energy converter comprising at least one reaction cell having two electrodes and an ion-conducting membrane, the reaction cells each comprising an inlet region for introducing the electrolyte into the reaction cell and an outlet region for conducting the electrolyte out of the reaction cell.

The energy storage system can also comprise at least one energy converter, the capacity of which to convert energy can be adjusted by the energy converter by means of a flow volume of an electrolyte.

The energy storage system can also comprise at least one pump for circulating the electrolyte.

The voltage converter can be line-commutated or self-commutated. A line-commutated first voltage converter is advantageous if the power grid is a public grid or a network having a rotating machine directly coupled thereto. A self-commutated first voltage converter is advantageous if the power grid is an isolated operation that does not have rotating machines directly coupled thereto.

The current converter device can comprise a plurality of voltage converters and an intermediate circuit, a first voltage converter being able to be connected to a power grid and being connected to an intermediate circuit. Furthermore, the current converter device can comprise at least a second and in particular a third voltage converter, which are connected to an intermediate circuit. At least one energy store can be connected in each case to the second and third voltage converter. The controller can in particular be connected to the second and third voltage converters and can be designed to control the power flow direction of the second and third voltage converters. More particularly, the controller can be designed to simultaneously control the power flow direction in the second voltage converter in the opposite direction to the power flow direction in the third voltage converter. This measure not only makes it possible to transfer energy from one energy generator to an energy store and then from the energy store to a power grid, but also allows energy to be transferred from one energy store to another energy store within the current converter device. This may be expedient in terms of energy. Losses can be significantly reduced as a result. In particular, the current converter device according to the invention allows energy to be transferred in this manner in all operating states of the overall system.

In the process, the controller can be designed to actuate the second and third voltage converters in such a way that energy is conducted from the energy store connection of the second voltage converter to the energy store connection of the third voltage converter. In doing so, the energy is conducted from the energy store connection of the second voltage converter to the energy store connection of the third voltage converter via the intermediate circuit.

The controller can also be designed to monitor the voltage at the second and third voltage converters, in particular the voltages at the energy store connections of the voltage converters. It is thus possible to recognize whether energy should be transferred from an energy store connected to one of the voltage converters, to an energy store connected to another voltage converter.

The controller can also be designed to determine the charge status or charge state of the connectable energy stores. This information may also be useful for deciding whether one of the energy stores should be charged by the energy of the other energy store.

The controller can also be designed to control the power of the voltage converter. The storage state or charge state of the connectable energy stores can be controlled as a result.

The controller can also be connected to the first voltage converter and designed to control the power flow direction of the first voltage converter. The controller can thus be used to govern whether energy is transferred from the current converter device to the power grid via the first voltage converter or whether, conversely, the connectable energy stores of the current converter device are connected to the power grid via the first voltage converter, such that energy from the power grid is stored in the connectable energy stores.

To keep the losses low, the first voltage converter can be able to be switched off. More particularly, the controller can be designed to switch the first voltage converter off while the second and third voltage converters continue to run and transfer energy from one energy store to the other. Therefore, energy can be transferred within the current converter device in order to increase the energy efficiency of the current converter device, without energy being expended in the process to operate the first voltage converter or any energy being provided to the power grid via the first voltage converter.

Like or different energy stores can be connectable to the current converter device. For example, conventional accumulators, flow batteries (redox flow cells) or other electrochemical/physical membranes can be used.

These different energy stores can be connectable in parallel to the current converter device according to the invention, or the current converter device can be connected to just one type of energy store, for example only to flow batteries.

The controller can be designed to charge and discharge a plurality of flow batteries, which are all connected to a common pair of electrolytes and can be connected to the current converter device. A system of this type can be operated in a very energy-efficient manner.

The controller can be designed to charge and discharge a plurality of flow batteries and at least one other different energy store. A lead acid accumulator can be provided as a different energy store, for example. The controller can be designed to start up the flow batteries using an energy store of a different type, even if the flow batteries themselves have too little charge to be able to restart themselves.

The first voltage converter can be designed as a bidirectional inverter and/or the second and third voltage converters can be designed as bidirectional DC-DC converters. In particular, the first voltage converter can be designed as a bidirectional AC-DC converter. The bidirectional AC-DC voltage converter makes it possible to tap energy from a single-phase or multiphase power grid and to supply said energy to the intermediate circuit, or to tap energy from the energy stores via the intermediate circuit and to feed said energy into the single-phase or multiphase power grid.

If the DC-DC converters are bidirectional, energy can be transferred from the energy stores into the intermediate circuit, and energy can also be transferred from the intermediate circuit into the energy stores.

The second and third energy voltage converters can be isolated in terms of potential. This can ensure that energy is transferred between two energy stores only via the voltage converters.

In the second and third voltage converters, transformers can be provided. As a result, a high intermediate circuit voltage can be achieved in an energy-efficient manner.

The intermediate circuit voltage can be between 500 V and 1500 V. The intermediate circuit can be at least 10 times higher than the voltage at the connectable energy stores. The first voltage converter can then also convert the energy very efficiently and can be implemented cost-effectively. In particular, said first voltage converter does not have to be isolated in terms of potential. In addition, only a relatively low current flows in the intermediate circuit compared with the current that would flow if the intermediate circuit voltage was, for example, 48 V. Copper losses are thus reduced. Less copper is also required, keeping the costs of the current converter device low.

The voltage converter, in particular the first voltage converter, can be isolated in terms of potential.

The voltage converter, in particular the first voltage converter, can be designed for connection to a single-phase or multiphase, in particular three-phase, power grid.

Each voltage converter can be formed as a resonant voltage converter. In this way, energy can be converted in a very efficient manner.

The controller can be designed as a self-learning controller. The controller can in particular be designed to learn to run individual energy stores empty or to recharge them, depending on the daily power requirement or cycle.

The controller can comprise a communication connection to a "smart grid". The term "smart grid" includes the communicative networking and control of current generators, stores, electrical consumers and grid operating means in energy transmission and distribution grids for the electricity supply. This can also be advantageous in an isolated grid.

A third aspect of the invention features an energy storage system arrangement comprising a plurality of current converter devices according to the invention, the current converter devices having a common controller. This makes it possible to first transfer energy between the energy stores within a current converter device, in order to keep losses low. It is then possible to transfer energy between the current converter devices so as to further reduce losses. In particular, the losses can be reduced to one energy store. The common controller makes it possible to optimize both the flow of energy between the individual energy stores and between the current converter devices.

This one common controller can be formed as a master controller in a current converter device. The master controller can then be connected to one or more controllers of another current converter device, which are then formed as slave controllers.

In an energy storage system arrangement of this kind, the intermediate circuit voltage of two current converter devices can be or is combined. The energy can then be transferred by energy stores of different current converter devices in a very energy-saving manner.

The voltage converter(s) and the controller can be housed in a common housing, preferably in a metal housing. This increases the reliability and the immunity to interference of the current converter device and thus the efficiency too.

The controller of the voltage converters and the energy store peripherals can be integrated on the same printed circuit board. This makes the system more cost-effective, but also increases the reliability and the immunity to interference of the current converter device and thus the efficiency too.

The controller of the voltage converters and of the energy store peripherals can be integrated on the same microprocessor, in particular a DSP. This makes the system more cost-effective, but also increases the reliability and the immunity to interference of the current converter device and thus the efficiency too.

The controller of the voltage converters and of the energy store peripherals can be integrated on the same programmable logic device, in particular an FPGA (field programmable gate array). This makes the system more cost-effective, but also increases the reliability and the immunity to interference of the current converter device and thus the efficiency too.

A fourth aspect of the invention features a method of charging and discharging energy stores by means of a current converter device having a voltage converter, comprising the following steps:

determining a power flow direction specification for the voltage converter, determining an actuation signal for at least one energy store peripheral, outputting the actuation signal via a control connection.

This method makes it possible to convert energy in a particularly efficient and cost-effective manner.

The voltage converter can also be actuated by the power flow direction specification.

A fifth aspect of the invention features a method of increasing the energy efficiency of a current converter device that comprises an intermediate circuit and at least two voltage converters which are connected to the intermediate circuit, at least one energy store being connectable to each voltage converter, the power flow direction of the voltage converters being controlled, in particular the power flow direction in one of the current converters being controlled in particular simultaneously in the opposite direction to the power flow direction in the other voltage converter. This method makes it possible to transfer energy from one energy store to another energy store via the voltage converters and intermediate circuit. As a result, the energy efficiency of the current converter device can be increased.

The current converter device can comprise an additional voltage converter which is connected to the intermediate circuit, energy being transferred from at least one energy store to the additional voltage converter, or vice versa, via one of the first two voltage converters and the intermediate circuit. As a result, energy can be transferred from an energy store to a power grid that is connected to an additional voltage converter. In addition, it is possible to transfer energy from the power grid to an energy store and to store it therein.

The power of the voltage converters can be controlled.

In particular, the power of the voltage converters can be controlled in such a way that energy losses are kept low. The charge state of the energy stores can also be monitored for this purpose.

Furthermore, it is advantageous in terms of energy efficiency for the additional voltage converter to be switched off while the two first voltage converters continue to operate and transfer energy from one energy store to the other energy store.

Instead of providing a plurality of energy stores in a partially charged state, it may be advantageous in terms of energy to completely empty one energy store, in particular by supplying the energy stored therein to another energy store.

Energy can first be transferred between at least two energy stores of the current converter device, and then transferred between at least two current converter devices. The energy efficiency of the overall system can thus be improved.

Note that herein the terms "designed to", "configured to", and "operable to" are used interchangeably.

Additional features and advantages of the invention will become apparent from the following description of an embodiment of the invention with reference to the figures of the drawings, which show details essential to the invention, and from the claims. The individual features can each be implemented per se or together in any combination in a variant of the invention.

A preferred embodiment of the invention is shown schematically in the drawings, and will be explained hereinafter in more detail with reference to the figures of the drawings, in which:

DETAILED DESCRIPTION

Figure 1:
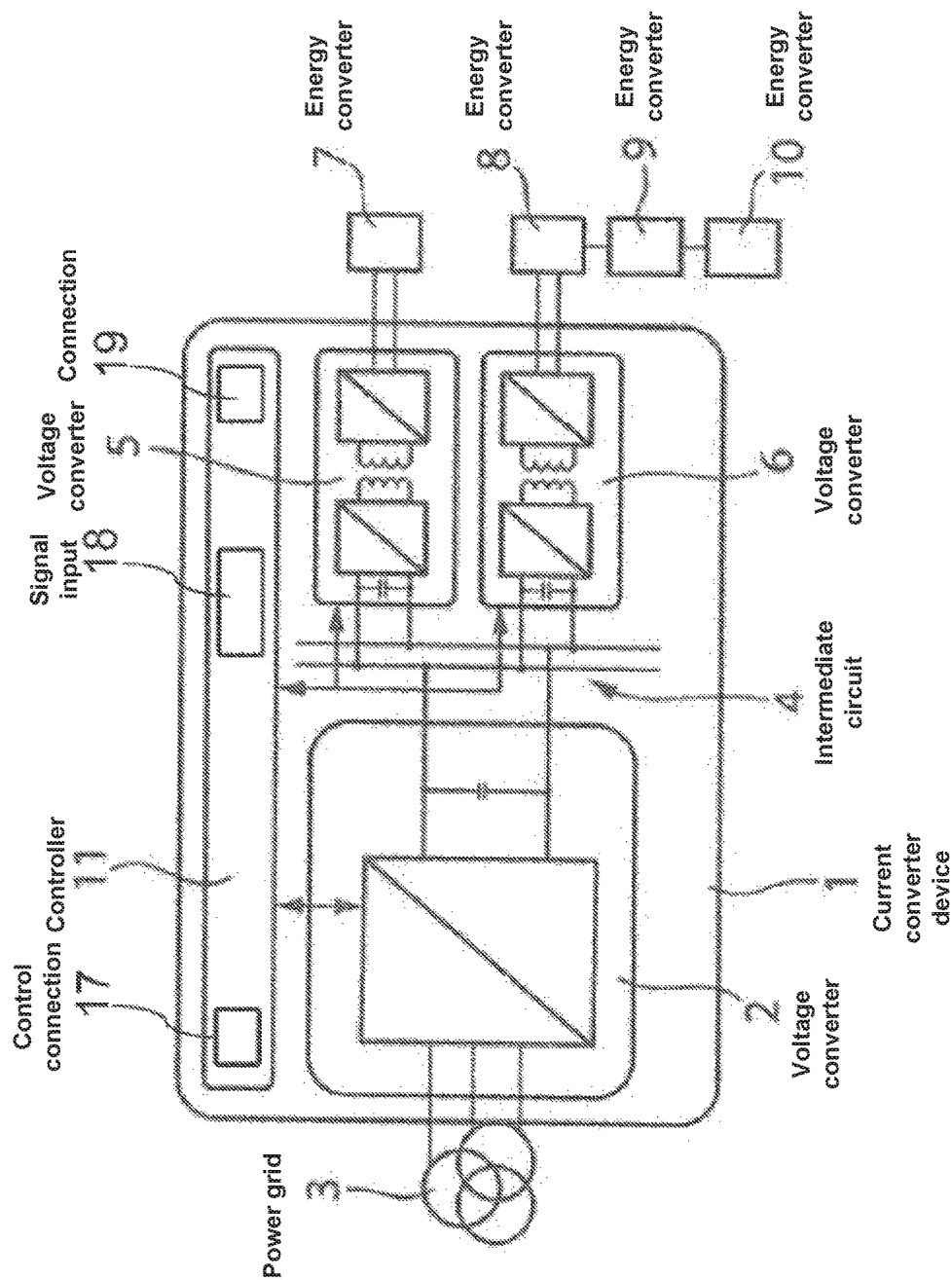
FIG. 1 is a schematic illustration of an example current converter device.

FIG. 1 shows a current converter device 1 comprising a first voltage converter 2 that can be connected to a single-phase or multiphase power grid 3. The first voltage converter 2 can be formed as an AC/DC converter, in particular a bidirectional AC/DC converter, and is connected to an intermediate circuit 4, to which a second and a third voltage converter 5, 6 are connected in turn. The voltage converters 5, 6 may be formed as DC/DC converters, in particular bidirectional DC/DC converters, for example, and can each convert over 5 kW of power. More than the two voltage converters 5, 6 shown can be connected to the intermediate circuit 4. The voltage converters 5, 6 can each be connected to one or more electrochemical energy converters 7 to 10, the voltage converter 5 being connected to the electrochemical energy converter 7 and the voltage converter 6 being connected to the electrochemical energy converters 8 to 10 in the embodiment shown. The electrochemical energy converters 8 to 10 could also be connected in parallel with the voltage converter 6.

The voltage at the intermediate circuit 4 can be considerably higher than the voltage at the energy converters 7 to 10. This makes the current converter device 1 particularly efficient.

Furthermore, the current converter device 1 comprises a controller 11 which is connected to both the first voltage converter 2 and the voltage converters 5, 6 and is designed to control said converters. The controller 11 is designed in particular to control the power flow, in particular the direction of the power flow, in the voltage converters 5, 6. In the process, the controller 11 can actuate the voltage converters 5, 6 in such a way that energy is transferred for example from the electrochemical energy converter 7 to the electrochemical energy converter 8, or vice versa, via the voltage converter 5, the intermediate circuit 4 and the voltage converter 6. During this transfer, the controller 11 can switch off the voltage converter 2. Furthermore, the controller 11 can actuate the voltage converters 2, 5, 6 in such a way that power flows from the power grid 3 to the electrochemical energy converters 7 to 10 via the voltage converter 2, the intermediate circuit 4 and the voltage converters 5, 6. The controller 11 can in this case also actuate just one of the voltage converters 5, 6 such that energy is only transferred to the energy converter 7, for example. Furthermore, the controller 11 can control the power flow such that energy stored in the energy converter 7 is fed into the power grid 3 via the voltage converter 5, the intermediate circuit 4 and the voltage converter 2, for example.

The controller 11 also comprises a control connection 17 for connecting at least one energy store peripheral.

In addition, the controller 11 comprises a signal input 18 for detecting one or more of the following process parameters:

temperature of the electrolyte,
pressure of the electrolyte,
flow volume of the electrolyte,
fill level of the electrolyte in the supply tank 31, 32.

In addition, the controller 11 comprises a connection 19 for graphically displaying the process parameters, the power flow direction, the power flow rate, and/or the amount of energy.

Since the voltage converter 2 can be switched off and energy can be transferred between the energy converters 7 to 10, the energy efficiency of the current converter device 1 can be increased further.

Figure 2:
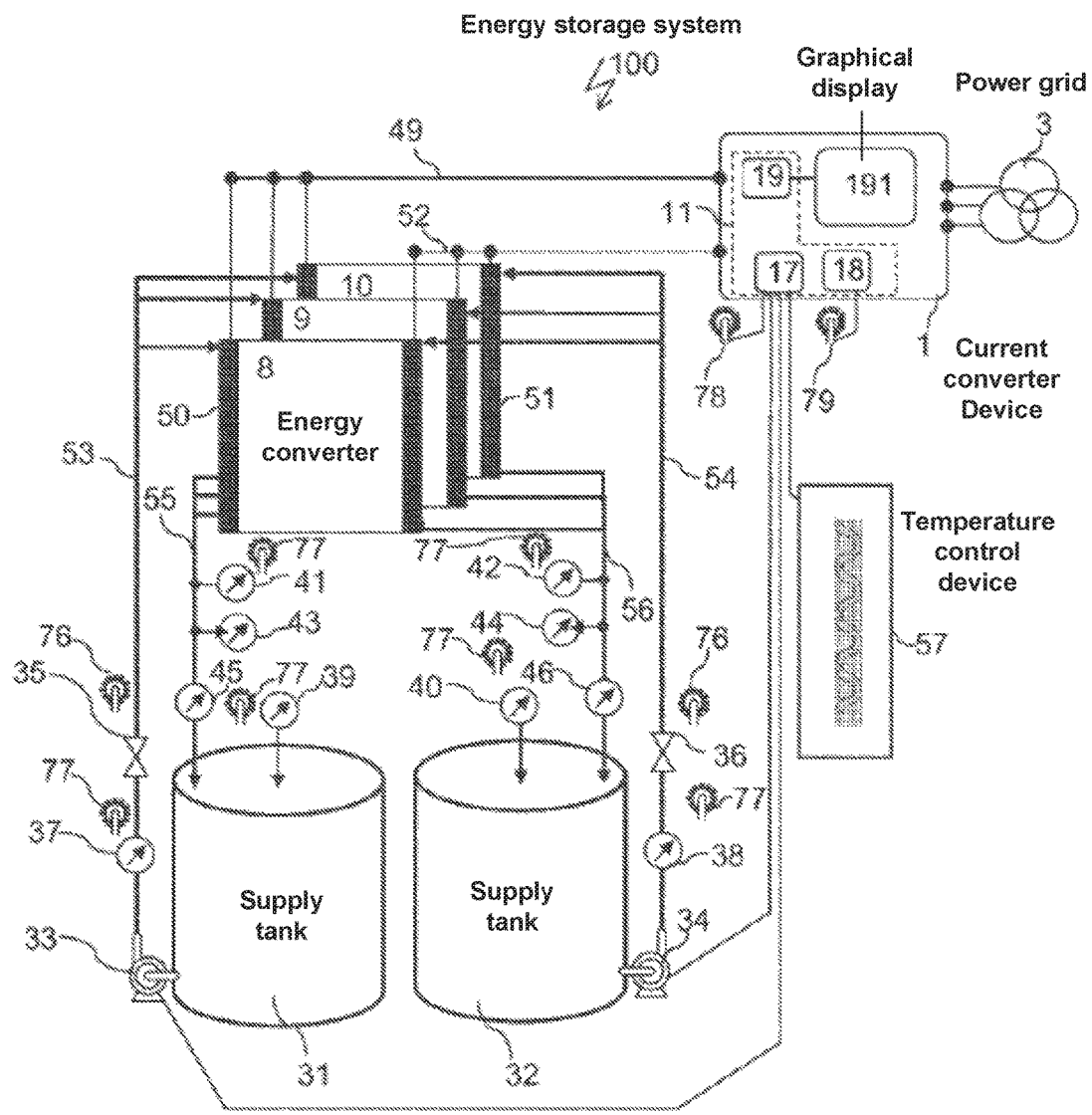
FIG. 2 is a schematic illustration of an example energy storage system.

FIG. 2 is a schematic illustration of an energy storage system 100 according to the invention. The one current converter device 1 from FIG. 1 is part of the energy storage system 100 and is connected to a single-phase or multiphase power grid 3. In this case too, the controller 11 comprises a control connection 17 for connecting at least one energy store peripheral, a signal input 18 for detecting one or more process parameters, and a connection 19 for graphically displaying the process parameters, the power flow direction, the power flow rate and/or the amount of energy. A graphic display device 191 can also be provided in or on the current converter device 1.

In the embodiment of FIG. 2, three parallel electrochemical energy converters 8, 9, 10 are shown, which are part of an energy store that is formed as a flow battery. An energy store having this type of electrochemical energy converters 8, 9, 10 is also known as a redox flow battery. Said store comprises a circulation arrangement for electrolytes, electrolyte lines for supplying and conducting away one or more electrolytes from a supply tank 31, 32 to the electrochemical energy converters 8, 9, 10 and back to the same supply tank 31, 32 in the manner of a loop process, the electrochemical energy converters 8, 9, 10 comprising at least one reaction cell having two electrodes 50, 51 and an ion-conducting membrane (not shown). The energy converters each comprise an inlet region for introducing the electrolyte into the reaction cell and an outlet region for conducting the electrolyte out of the reaction cell.

A flow battery is a rechargeable battery in which energy is chemically stored in liquid electrolytes (saline aqueous solution). Flow batteries are also referred to as redox flow batteries or just as redox batteries when reduction and oxidation processes take place therein.

In these types of batteries, tanks for supplying the electrolytes are provided, which contain all the reactive material in liquid form. During charging and discharging, the electrolytes are transported in a closed loop system, chemically bound electrical energy being removed from or added to the system (reduction/oxidation), thus producing a chemical energy store. In addition to the supply tanks for the electrolytes, the loop system also comprises pipe systems—the electrolyte lines—in which the electrolytes are transported by means of pumps or the like.

There are two electrolytes—one for the positive reaction and one for the negative reaction. The two electrolytes are not mixed together, but rather are separated by a very thin membrane in a reaction cell—the electrochemical reaction space. The very thin membrane is an ion-conducting membrane that allows selected ions to pass through from one side to the other.

In the electrochemical reaction space, there are also very stable electrodes on which the critical reactions take place. Since the reactions involve only the dissolved salts, the electrodes themselves do not undergo any chemical or physical changes, for which reason it is possible to have a large number of charging and discharging cycles without the capacity dropping significantly in the process.

A very specific type of flow battery is the vanadium redox flow battery. The vanadium salts are present in both the negative and the positive electrolytes in different oxidation stages. Owing to its four distinct oxidation stages in which it forms stable solutions, vanadium is particularly suitable for operating as chemical stores in flow batteries. A corresponding flow battery having these vanadium electrolytes obtains almost any number of charging and discharging cycles, a very high energy density per volume or per weight being achieved at the same time.

Vanadium redox flow batteries of this type are particularly beneficial for supplying electrical energy to households that operate photovoltaic installations, or for example wind energy installations or wind farms. The use thereof as very large energy stores, i.e., greater than 1 MWh, is also expedient and in addition extremely efficient.

In order to be able to convert electrical energy into an electrochemical energy store of this type in a particularly efficient manner, it is necessary to control energy store peripherals, such as the circulation pumps 33, 34. In this case, the pump 33 pumps the positive electrolyte from the supply tank 31 to the energy converters (stacks) 8, 9, 10 via the supply line 53. The positive electrolyte then flows via the return line 55 back into the supply tank 31. Similarly, the pump 34 pumps the negative electrolyte from the supply tank 32 to the energy converters (stacks) 8, 9, 10 via the supply line 54. The negative electrolyte then flows back into the supply tank 32 via the return line 56. Alternatively or additionally, the flow rate and the pressure of the electrolytes can be controlled by controllable throttle valves 35, 36. The fill level of the electrolytes can be monitored by fill level sensors 39, 40. The flow volume of the electrolytes can be monitored by flow sensors 37, 38 in the supply line and/or by flow sensors 45, 46 in the return line for the electrolytes. The temperature of the electrolytes can be monitored by temperature detectors 41, 42. The temperature can be controlled by a controllable temperature control device 57, which can be in the form of a separate or combined cooling and heating device.

The energy converters 8, 9, 10 each comprise a positive electrode and a negative electrode. To aid clarity, in FIG. 2 only the positive electrode 50 of the energy converter 8 and negative electrode 51 of the energy converter 10 are provided with a reference numeral.

Electrical connections from the positive electrodes to the current converter device 1 are made by means of a positive connection line 49 and electrical connections from the negative electrodes to the current converter device are made via a negative connection line 52.

A plurality of energy store peripherals, e.g., the pumps 33, 34 or the temperature control device 57, are connected to the control connection 17 of the controller 11. In this embodiment, said peripherals are connected directly to cable connections. These can be analogue or digital control lines and can be used for controlling the energy store peripherals. Furthermore, a transceiver device 78 is connected to the control connection 17 and can be used for wireless data communication and for controlling the throttle valves 35, 36. For this purpose, the throttle valves 35, 36 each comprise a transceiver device 76. All the sensors and transducers comprise a transceiver device 77. In this case, a plurality of sensors can also share one transceiver device 77. The signal input 18 likewise comprises a transceiver device 79, by which said input can receive the data from the sensors and transducers in order to detect one or more process parameters. Any data connection that is wireless in this embodiment can also be implemented using a wired connection. Any data connection that is wired in the embodiment can also be implemented wirelessly. By directly controlling the peripherals by means of the current converter device 1, the efficiency can be significantly increased. The current converter device 1 can recognize the charge state of the energy storage system 100 much more quickly and effectively, and furthermore can cause, in an anticipatory manner, a sufficient amount of electrolyte to flow through the energy converters in order to enable more efficient energy transformation.

Figure 3:
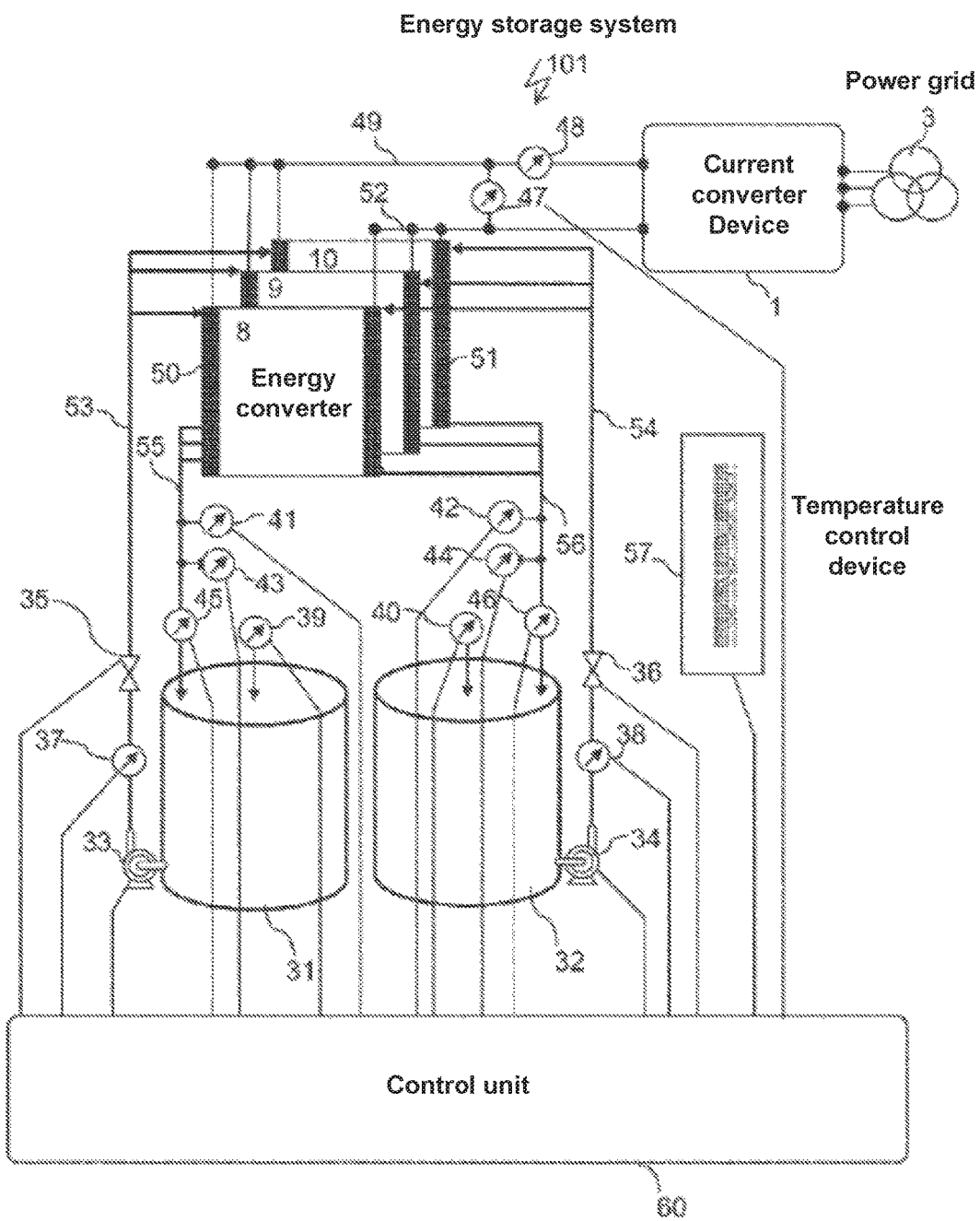
FIG. 3 is a schematic illustration of another example energy storage system.

FIG. 3 shows a conventional energy storage system 101. Components similar to those in the system shown in FIG. 2 have the same reference numeral. A separate control unit 60 attempts to detect the current charge state of the energy stores on the basis of various parameters, e.g., current, voltage, flow, temperature, pressure of the electrolytes, in order to thus control the energy store peripherals, e.g., the circulation pumps 33, 34. For its part, the control unit has to be supplied with current, which leads to a drop in efficiency. The energy storage system 101 requires additional sensors, such as a current measuring apparatus 48 and a voltage measuring apparatus 47 in order to acquire enough information about the charge state of the energy storage system 101.

What is claimed is:

1. A current converter device for charging and discharging energy stores, comprising:
    at least one bidirectional voltage converter connected to at least one electrochemical energy converter of an energy store having a circulation arrangement for electrolytes; and
    a controller connected to the voltage converter and configured to:
        control a power flow direction of the voltage converter, and
        control one or more energy store peripherals associated with the electrolytes based on the power flow direction specified by the controller,
        wherein the controller comprises at least one control connection for connecting at least one of the energy store peripherals.

2. The current converter device of claim 1, wherein the energy store peripherals comprise at least one of:
    at least one pump for circulating at least one of the electrolytes;
    at least one flow regulator for regulating a flow volume of at least one of the electrolytes;
    at least one temperature controller for adjusting a temperature of at least one of the electrolytes; or
    at least one pressure controller for adjusting a pressure of at least one of the electrolytes.

3. The current converter device of claim 1, wherein the controller is configured to control the voltage converter based on at least one of an amount of power or an amount of energy.

4. The current converter device of claim 1, wherein the controller is configured to control the control connection for the at least one of the energy store peripherals based on at least one of an amount of power or an amount of energy.

5. The current converter device of claim 1, wherein the controller comprises a signal input for detecting one or more process parameters comprising at least one of:
    a temperature of at least one of the electrolytes,
    a pressure of at least one of the electrolytes,
    a flow volume of at least one of the electrolytes, or
    a fill level of at least one of the electrolytes in a supply tank.

6. The current converter device of claim 1, wherein the controller comprises a connection for graphically displaying at least one of the power flow direction, one or more process parameters, a power flow rate, or an amount of energy.

7. The current converter device of claim 1, wherein the controller is configured to actuate the at least one of the energy store peripherals via the control connection based on the power flow direction specified by the controller.

8. The current converter device of claim 7, wherein the actuating of the at least one of the energy store peripherals occurs no later than the controller controlling the power flow direction of the voltage converter by the specified power flow direction.

9. The current converter device of claim 1, comprising:
    a first voltage converter connectable to a power grid;
    an intermediate circuit connected to the first voltage converter; and
    a second voltage converter connected to the intermediate circuit,
    wherein the at least one energy converter is connected to the second voltage converter, and
    wherein the controller is connected to the second voltage converter and configured to control a second power flow direction in the second voltage converter.

10. The current converter device of claim 9, further comprising a third voltage converter connected to the intermediate circuit,
    wherein the at least one energy converter is connected to the third voltage converter,
    wherein the controller is connected to the third voltage converter and configured to control a third power flow direction in the third voltage converter, and
    wherein the controller is configured to simultaneously control the second power flow direction in the second voltage converter in an opposite direction to a third power flow direction in the third voltage converter.

11. The current converter device of claim 9, wherein the first voltage converter comprises a bidirectional AC-DC converter, and the second voltage converter comprises a bidirectional DC-DC converter.

12. The current converter device of claim 1, wherein the energy store is formed as a redox flow battery.

13. An energy storage system comprising:
    at least one energy store having a circulation arrangement for electrolytes; and
    a current converter device comprising:
        at least one voltage converter connected to the energy store; and
        a controller connected to the voltage converter and configured to:
            control a power flow direction of the voltage converter, and
            control one or more of energy store peripherals associated with the electrolytes based on the power flow direction specified by the controller,
            wherein the controller comprises at least one control connection for connecting at least one of the energy store peripherals.

14. The energy storage system of claim 13, wherein the energy store comprises at least one energy converter connected to the voltage converter, and
    wherein the controller is configured to adjust a capacity of the energy converter to convert energy by a flow volume of at least one of electrolytes through the energy converter.

15. The energy storage system of claim 13, wherein the energy store peripherals comprise at least one of:
    at least one pump for circulating at least one of the electrolytes;
    at least one flow regulator for regulating a flow volume of at least one of the electrolytes;
    at least one temperature controller for adjusting a temperature of at least one of the electrolytes; or at least one pressure controller for adjusting a pressure of at least one of the electrolytes.

16. The energy storage system of claim 13, wherein the controller of the current converter device is connected to a second voltage converter of a second current converter device, and wherein the controller is configured to control the voltage converter and the second voltage converter such that energy is transferable between the current converter device and the second current converter device.

17. A method of charging and discharging energy stores, comprising:

determining a power flow direction specification for a bidirectional voltage converter of a current converter device, the voltage converter connected to at least one energy store having a circulation arrangement for electrolytes;

determining an actuation signal for at least one energy store peripheral associated with the electrolytes based on the power flow direction specification;

providing the actuation signal to the at least one energy store peripheral via a control connection to actuate the at least one energy store peripheral based on the power flow direction specification; and controlling a power flow direction of the voltage converter based on the power flow direction specification.

18. The method of claim 17, wherein the current converter device comprises:

an intermediate circuit, and second and third voltage converters each connected to the intermediate circuit, wherein the energy store is connected to each of the second and third voltage converters.

19. The method of claim 18, further comprising:

controlling a second power flow direction in the second voltage converter in an opposite direction to a third power flow direction in the third voltage converter.

20. The method of claim 18, further comprising:

transferring energy from a first energy store into a second energy store via the second and third voltage converters and the intermediate circuit, wherein each of the first and second energy stores is connected to each of the second and third voltage converters.

* * * * *